US012679158B2

(12) United States Patent
An et al.

(10) Patent No.: US 12,679,158 B2
(45) Date of Patent: Jul. 14, 2026

(54) DRIVE MODULE AND MOVABLE OBJECT INCLUDING THE SAME

(71) Applicants: Hyundai Motor Company, Seoul (KR); Kia Corporation, Seoul (KR)

(72) Inventors: Jea Kyoo An, Seoul (KR); Hun Keon Ko, Hwaseong-si (KR); Joo Young Chun, Hwaseong-si (KR); Jun Hwan Park, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/948,793

(22) Filed: Nov. 15, 2024

(65) Prior Publication Data

US 2026/0021684 A1      Jan. 22, 2026

(30) Foreign Application Priority Data

Jul. 19, 2024     (KR) ........................ 10-2024-0095879

(51) Int. Cl.
B60G 17/015          (2006.01)
(52) U.S. Cl.
CPC ...... B60G 17/0157 (2013.01); B60G 2202/42 (2013.01); B60G 2500/32 (2013.01)
(58) Field of Classification Search
CPC ............ B60G 17/0157; B60G 2202/42; B60G 2500/32; B60G 17/0152
See application file for complete search history.

(56) References Cited

U.S. PATENT DOCUMENTS

| | | | |
|---|---|---|---|
| 6,811,454 B2 | 11/2004 | Royle | |
| 11,639,196 B2 | 5/2023 | Ryu | |
| 2003/0176119 A1 | 9/2003 | Royle | |
| 2023/0085585 A1 * | 3/2023 | Ryu ........................ B60G 7/006 | |
| | | | 280/5.521 |
| 2023/0234415 A1 | 7/2023 | Seong | |

FOREIGN PATENT DOCUMENTS

| | | | | |
|---|---|---|---|---|
| DE | 102023212301 A1 * | 6/2025 | ............... | B62D 7/18 |
| FR | 2884795 A1 * | 10/2006 | ......... | B60G 17/0152 |
| JP | H1178449 A | 3/1999 | | |
| JP | 2004506564 A | 3/2004 | | |

(Continued)

OTHER PUBLICATIONS

DE-102023212301-A1 Machine English Translation (Year: 2023).*

(Continued)

*Primary Examiner* — Jason D Shanske
*Assistant Examiner* — Matthew James O'Neill
(74) *Attorney, Agent, or Firm* — Slater Matsil, LLP

(57) ABSTRACT

A drive module including a wheel configured to rotate about a first rotation axis extending in a first direction, a first frame coupled to the wheel, a second frame configured to move relative to the first frame, a link unit configured to connect the first frame and the second frame, and a posture adjustment part includes a posture adjustment motor having a shaft fixed to a link of the link unit, wherein the posture adjustment part is configured to adjust a posture of the drive module by controlling a motion of the link unit using the posture adjustment motor to thereby change a position of the first frame with respect to the second frame.

20 Claims, 5 Drawing Sheets

(56) References Cited

FOREIGN PATENT DOCUMENTS

KR          102471864 B1      11/2022
KR          20230036598 A      3/2023

OTHER PUBLICATIONS

FR-2884795-A1 Machine English translation (Year: 2006).*
Hyundai Motor Group, "Moved by Tech and Design: Hydrogen Energy, Robotics, and Software", CES 2024, Jan. 9-12, 2024, Las Vegas, USA, https://youtu.be/BJGvdr-trzU, Jan. 10, 2024, Total pp. 01.
Hyundai Motor Group, "Moved by Tech and Design: Hydrogen Energy, Robotics, and Software", CES 2024, Jan. 9-12, 2024, Las Vegas, USA, https://youtu.be/SFw8qgjgnRE, Jan. 10, 2024, Total pp. 01.
Hyundai Motor Group, "Moved by Tech and Design: Hydrogen Energy, Robotics, and Software", CES 2024, Jan. 9-12, 2024, Las Vegas, USA, https://www.facebook.com/hyundaimotorgroup/posts/107018327095 9850, Jan. 10, 2024, Total pp. 01.
Hyundai Motor Group, "Moved by Tech and Design: Hydrogen Energy, Robotics, and Software", CES 2024, Jan. 9-12, 2024, Las Vegas,          USA,          https://www.facebook.com/HyundaiMotorGroupNewsroom/posts/884213446534887, Jan. 10, 2024, Total pp. 01.
Hyundai Motor Group, "Moved by Tech and Design: Hydrogen Energy, Robotics, and Software", CES 2024, Jan. 9-12, 2024, Las Vegas, USA, https://www.facebook.com/HyundaiMotorGroupTV/posts/1095101674852966, Jan. 10, 2024, Total pp. 01.
Hyundai Motor Group, "Moved by Tech and Design: Hydrogen Energy, Robotics, and Software", CES 2024, Jan. 9-12, 2024, Las Vegas,          USA,          https://twitter.com/hmg_talk/status/1744950556404445618, Jan. 10, 2024, Total pp. 01.
Hyundai Motor Group, "Moved by Tech and Design: Hydrogen Energy, Robotics, and Software", CES 2024, Jan. 9-12, 2024, Las Vegas,          USA,          https://x.com/HMGnewsroom/status/1744949868970520835, Jan. 10, 2024, Total pp. 01.
Hyundai Motor Group, "Moved by Tech and Design: Hydrogen Energy, Robotics, and Software", CES 2024, Jan. 9-12, 2024, Las Vegas, USA, https://www.instagram.com/p/C16IMM-SEJ3/, Jan. 10, 2024, Total pp. 01.
Hyundai Motor Group, "Moved by Tech and Design: Hydrogen Energy, Robotics, and Software", CES 2024, Jan. 9-12, 2024, Las Vegas, USA, https://www.instagram.com/reel/C16FPWIKU7u/, Jan. 10, 2024, Total pp. 01.
Hyundai Motor Group, "Moved by Tech and Design: Hydrogen Energy, Robotics, and Software", CES 2024, Jan. 9-12, 2024, Las Vegas, USA, https://www.linkedin.com/feed/update/urn:li:activity:7150716742716014592, Jan. 10, 2024, Total pp. 01.
Hyundai Motor Group, "Moved by Tech and Design: Hydrogen Energy, Robotics, and Software", CES 2024, Jan. 9-12, 2024, Las Vegas, USA, https://tv.naver.com/v/45526754, Jan. 10, 2024, Total pp. 01.
Hyundai Motor Group, "Moved by Tech and Design: Hydrogen Energy, Robotics, and Software", CES 2024, Jan. 9-12, 2024, Las Vegas, USA, https://tv.kakao.com/channel/2658133/cliplink/443815739, Jan. 10, 2024, Total pp. 01.

* cited by examiner

DRIVE MODULE AND MOVABLE OBJECT INCLUDING THE SAME

CROSS-REFERENCE TO RELATED APPLICATIONS

This application claims priority to and the benefit of Korean Patent Application No. 10-2024-0095879 filed in the Korean Intellectual Property Office on Jul. 19, 2024, the entire contents of which are incorporated herein by reference.

TECHNICAL FIELD

The present disclosure relates to a drive module and a movable object including the same.

BACKGROUND

A plug-and-drive (PnD) module refers to a drive module coupled to a body of a movable object and configured to provide mobility to the body. The PnD module is manufactured to have a wheel, a steering system, a motor, a posture control device, and the like. Among the above-mentioned components, the posture control device may prevent the body of the movable object from being inclined with respect to a ground surface, such that a posture of the body is stabilized.

The posture control device provided in the PnD module in the related art has been provided as a hydraulic pump with a relatively large volume. The posture control device in the related art causes a problem of a deterioration in spatial utilization of the movable object.

Therefore, recently, there has been an increasing demand for a PnD module having a posture control device capable of being manufactured to have a minimized size and efficiently controlling a posture of a movable object.

SUMMARY

An embodiment of the present disclosure can provide a drive module having a structure capable of efficiently controlling a posture of a movable object.

To achieve the above-mentioned advantages, an embodiment of the present disclosure may provide a drive module including: a wheel configured to rotate about a first rotation axis that is an imaginary straight line extending in a first direction; a first frame having a relative height fixed with respect to the wheel; a second frame configured to move relative to the first frame; a link unit configured to connect the first frame and the second frame; and a posture adjustment part configured to adjust a posture of the drive module by controlling a motion of the link unit to change a position of the second frame with respect to the first frame.

The link unit may include: a first link including a first-first end rotatably connected to an upper portion of the first frame, and a first-second end rotatably connected to an upper portion of the second frame; and a second link including a second-first end rotatably connected to a lower portion of the first frame, and a second-second end rotatably connected to a lower portion of the second frame, and a first link length, which is a spacing distance between the first-first end and the first-second end, and a second link length, which is a spacing distance between the second-first end and the second-second end, may be different from each other.

The posture adjustment part may include a posture adjustment motor having a shaft fixed to any one of the first-first end, the first-second end, the second-first end, and the second-second end.

The link unit may further include a third link having one end rotatably connected to the upper portion of any one of the first frame and the second frame, and the other end rotatably connected to the lower portion of the other of the first frame and the second frame, and the third link may be configured such that a spacing distance between one end of the third link and the other end of the third link is changed when any one of the first frame and the second frame moves relative to the other of the first frame and the second frame.

The third link may include: a first link member configured to define one end of the third link; a second link member configured to define the other end of the third link; and an elastic member having one end tightly attached to the first link member, and the other end tightly attached to the second link member, the elastic member being configured to be compressed or expanded by an elastic force.

The first link member may have a cylinder shape having a cylinder space into which the second link member is capable of being inserted, the second link member may have a piston shape provided to be inserted into the cylinder space, and the elastic member may have a coil spring shape disposed in the cylinder space.

The third link may be disposed to be spaced apart from the shaft, the first link member may be rotatably connected to the upper portion of the second frame, and the second link member may be rotatably connected to the lower portion of the first frame.

The third link may be oriented to traverse a space surrounded by the first frame, the second frame, the first link, and the second link when one side of the first frame based on a link direction is viewed in parallel with the link direction when the link direction is a direction in which a rotation center of the first link member with respect to the upper portion of the second frame extends.

A direction in which a rotation center of the first link member with respect to the upper portion of the second frame extends may be a link direction, an imaginary straight line passing through a center of the first-second end and extending in the link direction may be a first link rotation axis, an imaginary straight line passing through a center of the second-first end and extending in the link direction may be a second link rotation axis, the link unit may include: a first link shaft configured to define the first link rotation axis; and a second link shaft configured to define the second link rotation axis, the first-second end and the first link member may be coupled to the first link shaft and configured to rotate about the first link rotation axis, and the second-first end and the second link member may be coupled to the second link shaft and configured to rotate about the second link rotation axis.

The drive module may further include: a support part configured to define the first rotation axis and support the wheel; and a steering motor configured to rotate the support part about a second rotation axis, which is an imaginary straight line extending in a second direction intersecting the first direction, to steer the wheel, in which the steering motor is disposed above the support part, and in which the first frame is fixed to the steering motor.

An imaginary straight line passing through the center of the first-second end and a center of the second-second end may be a reference straight line, the drive module may be configured to be placed in a first posture in which the second rotation axis and the reference straight line are provided in a parallel manner and a second posture in which the first frame is lowered relative to the second frame from the first posture, and the second rotation axis and the reference straight line may be provided in a non-parallel manner when the drive module is in the second posture.

The first link length may be shorter than the second link length.

The second-first end may be disposed above the support part.

The support part may have a suspension configured to connect a lower portion of the support part and an upper portion of the support part, the first frame may be fixed to a horizontally lateral portion of the steering motor, and the first frame may at least partially overlap the suspension of the support part when the drive module is viewed from above.

An embodiment of the present disclosure may provide a movable object including: a body; and a drive module configured to move the body, in which the drive module includes a wheel configured to rotate about a first rotation axis that is an imaginary straight line extending in a first direction; a first frame having a relative height fixed with respect to the wheel; a second frame configured to move relative to the first frame; a link unit configured to connect the first frame and the second frame; and a posture adjustment part configured to adjust a posture of the drive module by controlling a motion of the link unit to change a position of the second frame with respect to the first frame.

The link unit may include: a first link including a first-first end rotatably connected to an upper portion of the first frame, and a first-second end rotatably connected to an upper portion of the second frame; and a second link including a second-first end rotatably connected to a lower portion of the first frame, and a second-second end rotatably connected to a lower portion of the second frame, and a first link length, which is a spacing distance between the first-first end and the first-second end, and a second link length, which is a spacing distance between the second-first end and the second-second end, may be different from each other.

The posture adjustment part may include a posture adjustment motor having a shaft fixed to any one of the first-first end, the first-second end, the second-first end, and the second-second end.

The second frame may be mounted on a lower portion of the body, and the wheel may be configured to move toward or away from the body in a horizontal direction when the posture of the drive module is controlled by the posture adjustment part.

The first rotation axis may intersect a ground surface in a state in which the wheel is maximally moved away from the body.

The drive module according to the present disclosure may efficiently control the posture of the movable object.

DETAILED DESCRIPTION OF ILLUSTRATIVE EMBODIMENTS

Figure 1:
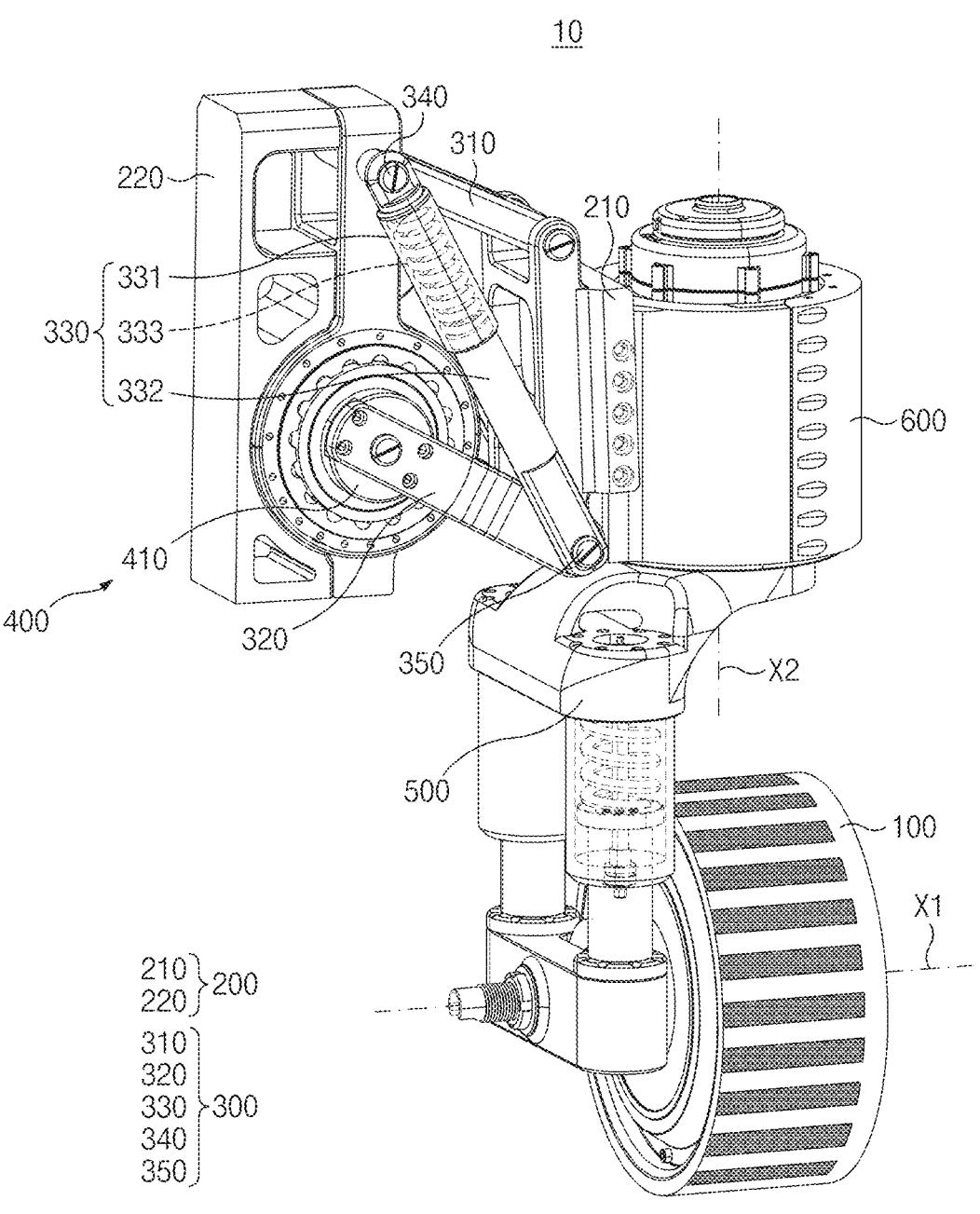
FIG. 1 is a perspective view of a drive module placed in a first posture according to an embodiment of the present disclosure.

Hereinafter, some example embodiments of the present disclosure will be described in detail with reference to the illustrative drawings. In giving reference numerals to constituent elements of the respective drawings, it can be noted that the same constituent elements can be designated by the same reference numerals, if possible, even though the constituent elements are illustrated in different drawings. Further, in the following description of the example embodiments of the present disclosure, a detailed description of related publicly-known configurations or functions can be omitted when it is determined that the detailed description of such can obscure the understanding of the example embodiments of the present disclosure.

Hereinafter, a drive module and a movable object including the same according to an example embodiment of the present disclosure will be described with reference to the drawings.

Figure 2:
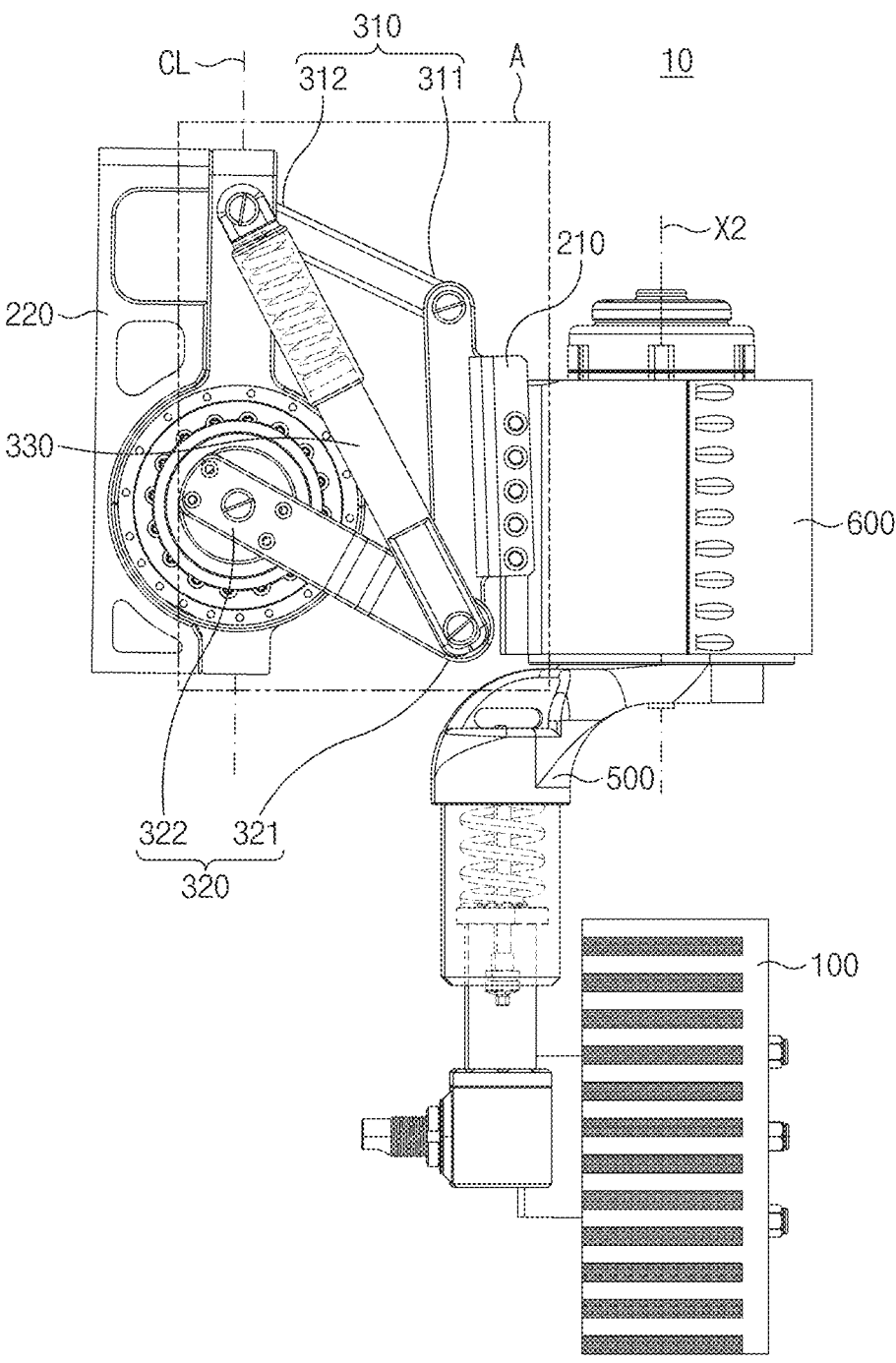
FIG. 2 is a front view of a drive module placed in a first posture according to an embodiment of the present disclosure.
Figure 3:
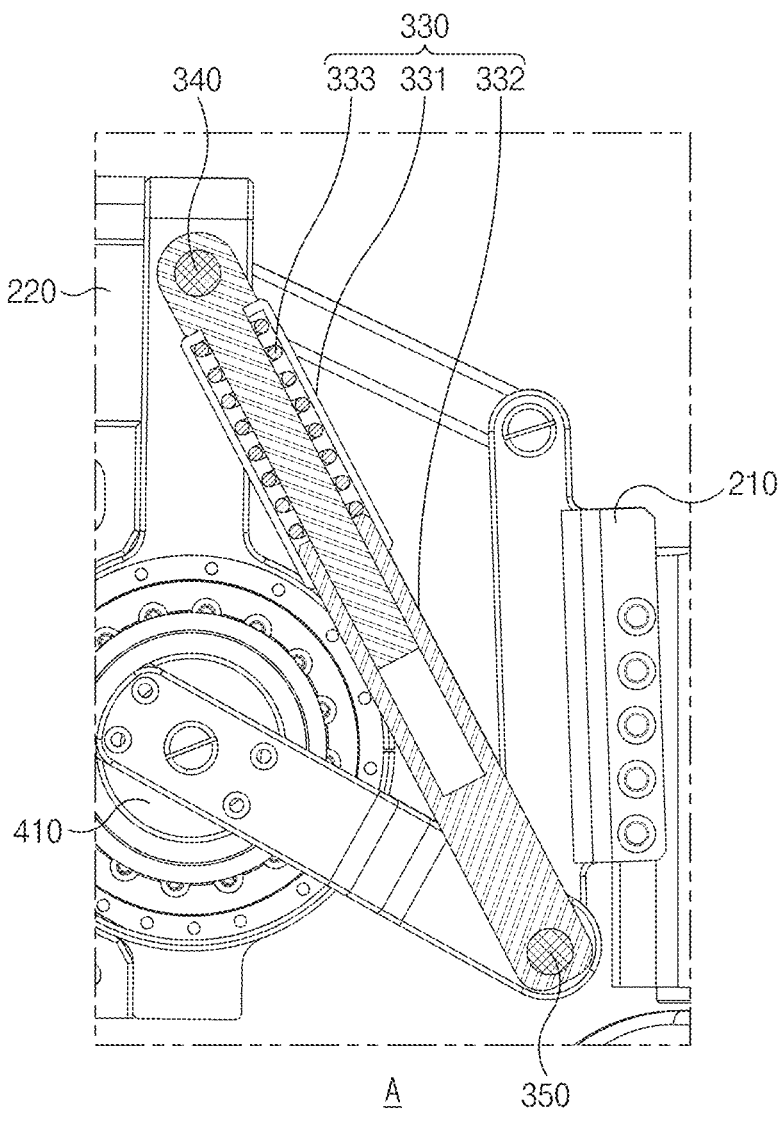
FIG. 3 is an enlarged view of part 'A' in FIG. 2.

FIG. 1 is a perspective view of the drive module placed in a first posture according to an embodiment of the present disclosure. FIG. 2 is a front view of the drive module placed in a first posture according to an embodiment of the present disclosure. FIG. 3 is an enlarged view of part 'A' in FIG. 2.

The movable object may refer to a structure configured to be movable by a wheel, a propeller, or the like. For example, the movable object may be variously configured as a vehicle, a drone, or the like. The movable object may include a body and a drive module 10. The body may provide a space that accommodates a user and/or items. The body may be moved by the drive module 10.

With reference to FIGS. 1 to 3, the drive module 10 may be detachably mounted on the body. The drive module 10 may be referred to as a plug-and-drive module (PnD module). The drive module 10 may move the body. The drive module 10 may control the posture of the body. The drive module 10 may be provided as a plurality of drive modules 10. The plurality of drive modules 10 may be mounted on a lower portion of the body and spaced apart from one another. The drive module 10 may include a wheel 100, a frame 200, a link unit 300, a posture adjustment part 400, a support part 500, and a steering motor 600.

The wheel 100 may be a rotary body including a rim, a tire, and the like. The wheel 100 may rotate about a first rotation axis X1 that is an imaginary straight line extending in a first direction. The wheel 100 may be rotatably connected to the support part 500. An in-wheel motor may be inserted into the wheel 100, and the in-wheel motor may be a motor for rotating the wheel 100.

The frame 200 may connect the body and the steering motor 600. The frame 200 may include a first frame 210 and a second frame 220. The first frame 210 may be fixed to the steering motor 600. The first frame 210 may connect the link unit 300 and the steering motor 600. More specifically, the first frame 210 may be fixed to a horizontally lateral portion of the steering motor 600.

The second frame 220 may be fixed to the body. The second frame 220 may connect the body and the first frame 210. The second frame 220 may support the posture adjustment part 400. For example, the posture adjustment part 400 may be disposed on a lower portion of the second frame 220.

Any one of the first frame 210 and the second frame 220 may move relative to the other of the first frame 210 and the second frame 220. For example, the first frame 210 may be configured to move in an upward/downward direction and/or a horizontal direction relative to the second frame 220 based on a motion of the link unit 300. In a detailed example, when the first frame 210 is lowered (or raised) relative to the second frame 220, a height of the body with respect to a ground surface may be decreased (or increased).

The link unit 300 may connect the first frame 210 and the second frame 220. A motion of the link unit 300 may be controlled by the posture adjustment part 400. The link unit 300 may include a first link 310, a second link 320, a third link 330, a first link shaft 340, and a second link shaft 350.

The first link 310 may connect an upper portion of the first frame 210 and an upper portion of the second frame 220. The first link 310 may include a first-first end 311 and a first-second end 312. The first-first end 311 may define one end of the first link 310. One end of the first link 310 may refer to an end of the first link 310 based on an outward direction. An inward direction of the first link 310 may refer to a direction in which the first frame 210 is directed toward the second frame 220.

The first-first end 311 may be rotatably connected to the upper portion of the first frame 210. The first-first end 311 may rotate about an imaginary straight line passing through a center of the first-first end 311 and extending in a link direction. The link direction may be defined as a direction parallel to a forward/rearward direction of the movable object.

The first-second end 312 may define the other end of the first link 310. The other end of the first link 310 may refer to an end of the first link 310 based on the inward direction. The outward direction of the first link 310 may refer to a direction opposite to the inward direction of the first link 310.

The first-second end 312 may be rotatably connected to the upper portion of the second frame 220. The first-second end 312 may rotate about a first link rotation axis that is an imaginary straight line passing through a center of the first-second end 312 and extending in the link direction. A spacing distance between the center of the first-first end 311 and the center of the first-second end 312 may be referred to as a first link length.

The second link 320 may connect a lower portion of the first frame 210 and a lower portion of the second frame 220. The second link 320 may include a second-first end 321 and a second-second end 322. The second-first end 321 may define one end of the second link 320. One end of the second link 320 may refer to an end of the second link 320 based on the outward direction.

The second-first end 321 may be rotatably connected to the lower portion of the first frame 210. The second-first end 321 may rotate about a second link rotation axis that is an imaginary straight line passing through a center of the second-first end 321 and extending in the link direction.

The second-second end 322 may define the other end of the second link 320. The other end of the second link 320 may refer to an end of the second link 320 based on the inward direction.

The second-second end 322 may be rotatably connected to the lower portion of the second frame 220. The second-second end 322 may rotate about an imaginary straight line passing through a center of the second-second end 322 and extending in the link direction. A spacing distance between the center of the second-first end 321 and the center of the second-second end 322 may be referred to as a second link length.

The first link length and the second link length may be different from each other. For example, the first link length may be shorter than the second link length. As described above, because the first link length and the second link length are different from each other, the first frame 210 may move not only in the upward/downward direction but also in a leftward/rightward direction relative to the second frame 220 when the link unit 300 moves. In a detailed example, when the first frame 210 is moved relative to the second frame 220 by a motion of the link unit 300, the first frame 210 may move in the upward/downward direction and the leftward/rightward direction relative to the second frame 220. In a more detailed example, when the first frame 210 is raised relative to the second frame 220, the first frame 210 may move away from the body. In summary, when the first frames 210 are raised relative to the second frames 220, the first frames 210 may move away from the body, such that an interval (tread) between the plurality of wheels 100 in the leftward/rightward direction may be increased. As another example, when the first frame 210 is lowered relative to the second frame 220, the first frame 210 may move toward the body.

The third link 330 may connect the lower portion (or the upper portion) of the first frame 210 and the upper portion (or the lower portion) of the second frame 220. For example, one end of the third link 330 may be rotatably connected to the lower portion of the first frame 210, and the other end of the third link 330 may be rotatably connected to the upper portion of the second frame 220.

When any one of the first frame 210 and the second frame 220 moves relative to the other of the first frame 210 and the second frame 220, a third link length, which is a spacing distance between two opposite ends of the third link 330, may be changed. For example, the third link length may increase when the first frame 210 is lowered relative to the second frame 220. As another example, the third link length may decrease when the first frame 210 is raised relative to the second frame 220.

The third link 330 may be oriented to traverse a space surrounded by the first frame 210, the second frame 220, the first link 310, and the second link 320 when one side of the third link 330 based on the link direction is viewed in parallel with the link direction. In other words, the third link 330 may be oriented in a direction intersecting the directions in which the first frame 210, the second frame 220, the first link 310, and the second link 320 are oriented, respectively. The third link 330 may include a first link member 331, a second link member 332, and an elastic member 333.

The first link member 331 may define one end of the third link 330. One end of the third link 330 may be rotatably connected to the upper portion of the second frame 220. For example, the first link member 331 may have a cylinder shape. For example, a cylinder space may be formed in the first link member 331, and the second link member 332 may be inserted into the cylinder space.

The second link member 332 may define the other end of the third link 330. The other end of the third link 330 may be rotatably connected to the lower portion of the first frame 210. For example, the second link member 332 may have a piston shape provided to be inserted into the cylinder space.

The elastic member 333 may be configured to be compressed or stretched by an elastic force. For example, the elastic member 333 may be a compression coil spring. One end of the elastic member 333 may be tightly attached to the first link member 331. The other end of the elastic member 333 may be tightly attached to the second link member 332. For example, when the elastic member 333 is compressed, a degree to which the second link member 332 is inserted into the cylinder space may increase. When the elastic member 333 is stretched, the degree to which the second link member 332 is inserted into the cylinder space may decrease.

For example, the third link length may be increased by a restoring force of the elastic member 333 in case that an external force applied to the elastic member 333 (e.g., by a posture adjustment motor 410 to be described below) is eliminated from a state in which the elastic member 333 is compressed by the external force applied to the elastic member 333).

The first link shaft 340 may be a shaft that defines the first link rotation axis. The first link shaft 340 may be disposed to penetrate the upper portion of the second frame 220. The first link shaft 340 may be oriented in parallel with the link direction. The first-second end 312 and the first link member 331 may be coupled to the first link shaft 340. In other words, a rotation axis of the first-second end 312 and a rotation axis of the first link member 331 may be identical to each other.

The second link shaft 350 may be a shaft that defines the second link rotation axis. The second link shaft 350 may be disposed to penetrate the lower portion of the first frame 210. The second link shaft 350 may be oriented in parallel with the link direction. The second-first end 321 and the second link member 332 may be coupled to the second link shaft 350. In other words, a rotation axis of the second-first end 321 and a rotation axis of the second link member 332 may be identical to each other.

Figure 4:
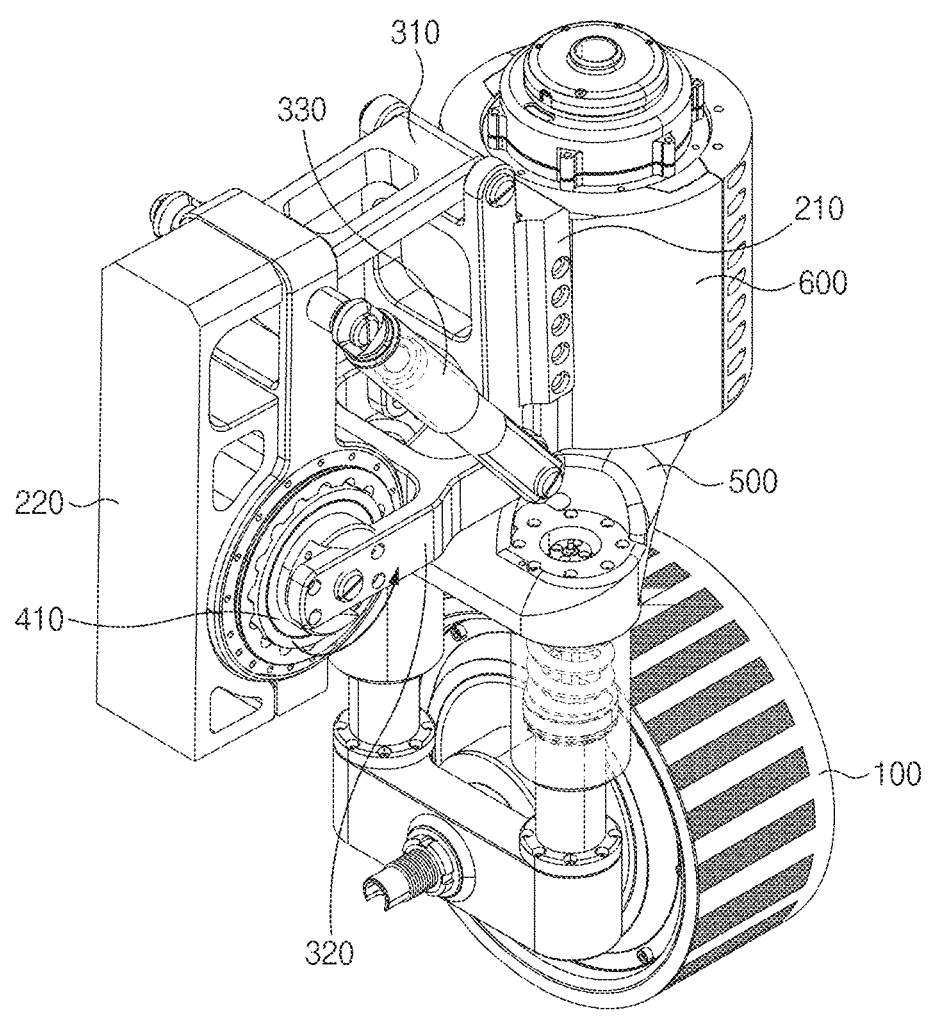
FIG. 4 is a perspective view of a drive module placed in a second posture according to an embodiment of the present disclosure.
Figure 5:
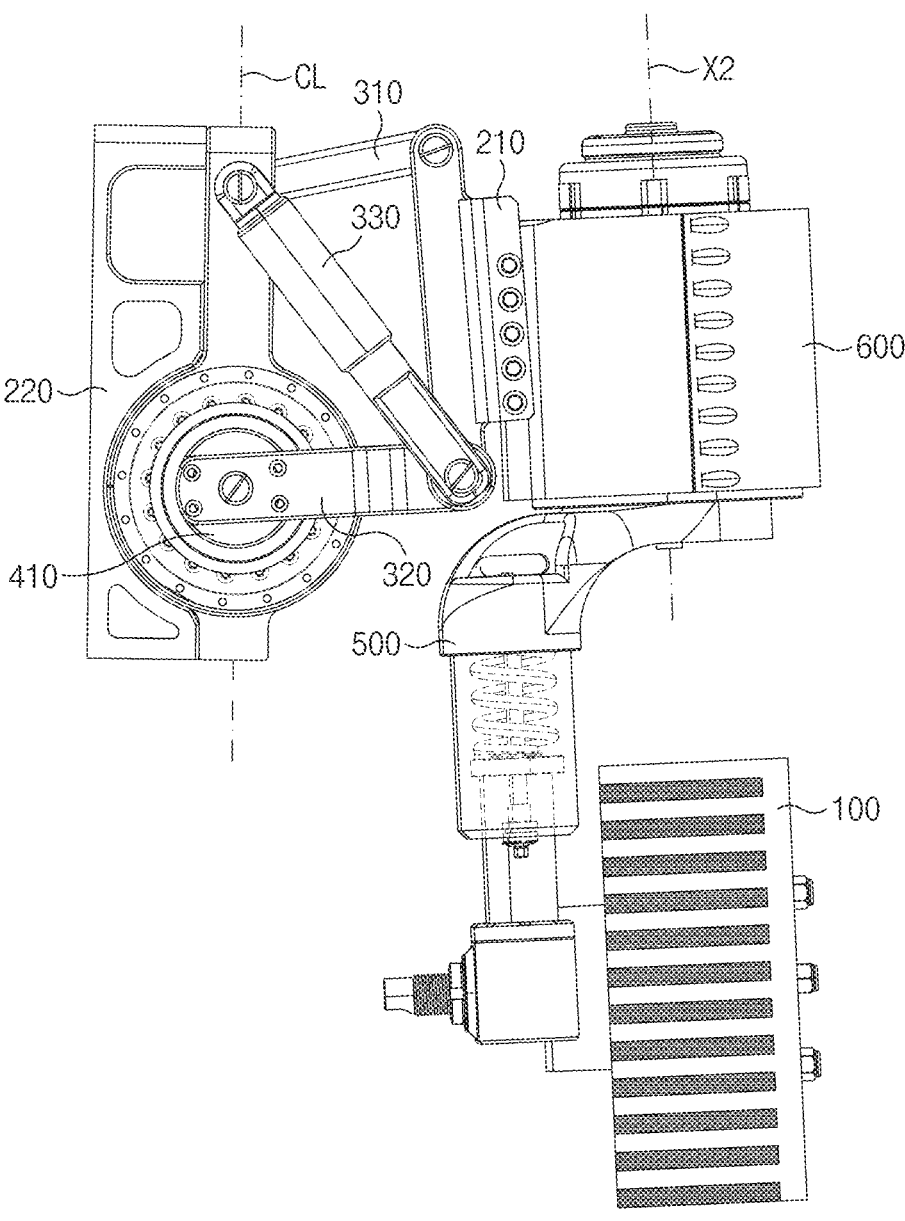
FIG. 5 is a front view of a drive module placed in a second posture according to an embodiment of the present disclosure.

FIG. 4 is a perspective view of the drive module placed in a second posture according to an embodiment of the present disclosure. FIG. 5 is a front view of the drive module placed in a second posture according to an embodiment of the present disclosure.

With reference further to FIGS. 4 and 5, the posture adjustment part 400 may adjust a posture of the drive module 10. For example, the posture adjustment part 400 may control a motion of the link unit 300. A position of the second frame 220 with respect to the first frame 210 may be changed by use of the posture adjustment part 400. The posture adjustment part 400 may include the posture adjustment motor 410 and a controller.

The posture adjustment motor 410 may include a motor housing, a rotor, a stator, a shaft, a speed reducer, and an inverter. The shaft of the posture adjustment motor 410 may be fixed to any one of the first-first end 311, the first-second end 312, the second-first end 321, and the second-second end 322. For example, the shaft of the posture adjustment motor 410 may be fixed to the second-second end 322 and rotate the second-second end 322.

Next, a process in which the link unit 300 is moved by rotational power generated by the posture adjustment motor 410 will be described.

An example process will be described in which the first frame 210 is raised relative to the second frame 220 during the process in which the link unit 300 is moved by the rotational power generated by the posture adjustment motor 410. The rotational power generated by the posture adjustment motor 410 may rotate the second-second end 322, and the second-first end 321 may be revolved by the rotation of the second-second end 322 so that the second-first end 321 moves upward. The first frame 210 may move upward as the second-first end 321 moves upward. When the first frame

210 moves upward, the first-first end 311 may be rotated by the motion of the first frame 210. When the first-first end 311 rotates, the first-second end 312 may be revolved and moved downward. When the second-first end 321 moves upward and the first-second end 312 moves downward, the first link member 331 and the second link member 332 may move toward each other, and simultaneously, the elastic member 333 may be compressed. The drive module 10 may be placed in the second posture by use of the above-mentioned process.

The elastic member 333 may be expanded at the time of cutting off a supply of power supplied to the second-second end 322 by the posture adjustment motor 410 to maintain the state in which the second-second end 322 has rotated. In case that the elastic member 333 is expanded, the first link member 331 and the second link member 332 may move away from each other, such that the third link length may increase. In this case, the second link member 332 may move downward relative to the first link member 331. In this case, the second link shaft 350 may be moved downward by the first link member 331, and the second-first end 321 coupled to the second link shaft 350 may be revolved downward relative to the second-second end 322. The drive module 10 may switch from the second posture to the first posture by use of the above-mentioned process.

The controller may be electrically connected to the posture adjustment motor 410 and implemented as a process that serves to decode and execute instructions on the basis of inputted information.

The support part 500 may support the wheel 100. The wheel 100 may be rotatably connected to a lower portion of the support part 500. The support part 500 may define the first rotation axis X1 that is a rotation center of the wheel 100.

An upper portion of the support part 500 may be rotatably connected to the steering motor 600. The support part 500 may have a suspension configured to connect the lower portion of the support part 500 and the upper portion of the support part 500. For example, the suspension may have a spring, a shock absorber, or the like, for absorbing an impact occurring between the wheel 100 and the steering motor 600. For example, the suspension may have a telescopic structure, and a length of the telescopic structure may vary in response to a state of a road surface on which the wheel 100 travels. As illustrated in FIG. 5, in an example of the present disclosure, the first frame 210 may at least partially overlap the suspension of the support part 500 when the drive module 10 is viewed from above.

The support part 500 may be disposed below the second-first end 321. For example, because the support part 500 is disposed below the second-first end 321, the support part 500 may not interfere with the first frame 210 when the support part 500 rotates about a second rotation axis X2 to be described below.

The steering motor 600 may rotate the support part 500 about the second rotation axis X2 to steer the wheel 100. The second rotation axis X2 may be defined as an imaginary straight line extending in a second direction intersecting the first direction. When an imaginary straight line passing through a center of the first-second end 312 and a center of the second-second end 322 is a reference straight line CL, the second rotation axis X2 and the reference straight line may be parallel to or intersect each other depending on the posture of the drive module 10. The steering motor 600 may be configured to consistently rotate the wheel 100 by 360 degrees or more. More specifically, a slip ring structure may be applied to the steering motor 600. Because the slip ring structure is applied to the steering motor 600, electric wires in the steering motor 600 may be prevented from being twisted even though the wheel 100 rotates 360 degrees or more.

The drive module 10 may be placed in the first posture (see FIGS. 1 and 2) in which the second rotation axis X2 and the reference straight line are disposed in a parallel manner and the second posture (see FIGS. 4 and 5) in which the second rotation axis X2 and the reference straight line are disposed in a non-parallel manner. When the drive module 10 is placed in the first posture, the first frame 210 may be placed in a state of being maximally raised relative to the second frame 220.

In a case that the drive module 10 switches from the first posture to the second posture, the first frame 210 may be placed in the state of being lowered relative to the second frame 220 from the state in which the drive module 10 is in the first posture. The tread between the plurality of wheels 100 may be larger in the second posture of the drive module 10 than in the first posture of the drive module 10. As described above, in the second posture of the drive module 10, the height of the body with respect to the ground surface may be small, and the tread between the plurality of wheels 100 may be large, such that traveling stability of the movable object may be improved. An area of the wheel 100, which is in contact with the ground surface, may be smaller in the second posture of the drive module 10 than in the first posture of the drive module 10.

When the drive module 10 is placed in the second posture, the first rotation axis X1 may intersect the ground surface. In other words, when the drive module 10 is placed in the first posture, the first rotation axis X1 may be parallel to the ground surface.

All the constituent elements, which constitute the embodiment of the present disclosure, may be integrally coupled or operate by being combined, but the present disclosure is not necessarily limited to the embodiment. That is, one or more of the constituent elements may be selectively combined and operated for other embodiments of the present disclosure. Unless explicitly described to the contrary, the words "comprise," "include," or "have" and variations such as "comprises," "comprising," "includes," "including," has," or "having," should be understood to imply the inclusion of stated elements but not the exclusion of any other elements. Unless otherwise defined, terms including technical or scientific terms may have a same meaning as commonly understood by those skilled in the art to which the present disclosure pertains. Terms such as those defined in a commonly used dictionary may be interpreted as having meanings consistent with meanings in the context of related technologies.

The above description is simply given for illustratively describing the technical spirit of the present disclosure, and those skilled in the art to which the present disclosure pertains can appreciate that various changes and modifications are possible without departing from the essential characteristic of the present disclosure. Therefore, the example embodiments disclosed in the present disclosure are provided for illustrative purposes and are not intended to necessarily limit the technical spirit of the present disclosure. The scopes of the technical spirit of the present disclosure is not limited thereby. The protective scopes of the present disclosure can be construed based on the following claims, and all the technical spirit in equivalent scopes thereto can be construed as falling within the scope of the present disclosure.

What is claimed is:

1. A drive module, comprising:
a wheel configured to rotate about a first rotation axis extending in a first direction;
a first frame coupled to the wheel;
a second frame configured to move relative to the first frame;
a link unit configured to connect the first frame and the second frame; and
a posture adjustment part configured to adjust a posture of the drive module by controlling a motion of the link unit to change a position of the second frame with respect to the first frame and the wheel;
wherein the link unit comprises:
a first link comprising a first-first end rotatably connected to a first-frame upper portion of the first frame, and a first-second end rotatably connected to a second-frame upper portion of the second frame via a first link shaft that penetrates the second-frame upper portion;
a second link comprising a second-first end rotatably connected to a first-frame lower portion of the first frame, and a second-second end rotatably connected to a second frame lower portion of the second frame; and
a third link comprising a third-first end connected to the second-frame upper portion of the second frame at a location at which the first link shaft penetrates the second-frame upper portion, and
wherein the posture adjustment part comprises a posture adjustment motor having a shaft fixed to any one of the first-first end, the first-second end, the second-first end, and the second-second end such that the shaft can rotate any one of the first-first end, the first-second end, the second-first end, and the second-second end.

2. The drive module of claim 1, wherein a first link length, which is a first spacing distance between the first-first end and the first-second end, and a second link length, which is a second spacing distance between the second-first end and the second-second end, are different from each other.

3. The drive module of claim 2, wherein:
the third link extends diagonally across the link unit,
the third link includes the third-first end rotatably connected to the second-frame upper portion of the second frame, and a third-second end rotatably connected to the first-frame lower portion of the first frame, respectively, and
the third link is configured such that a third spacing distance between the third-first end of the third link and the third-second end of the third link is changed in response to the first frame and the second frame moving relative to each other.

4. The drive module of claim 3, wherein the third link further comprises:
a first link member configured to define the third-first end of the third link;
a second link member configured to define the third-second end of the third link; and
an elastic member having a first-elastic-member end attached to the first link member, and a second-elastic-member end attached to the second link member, the elastic member being configured to be compressed or expanded by an elastic force.

5. The drive module of claim 4, wherein:
the first link member has a cylinder shape having a cylinder space into which the second link member is capable of being inserted, the second link member has a piston shape configured to be inserted into the cylinder space, and the elastic member has a coil spring shape disposed in the cylinder space.

6. The drive module of claim 4, wherein:

the third link is disposed to be spaced apart from the shaft, the first link member is rotatably connected to the second-frame upper portion of the second frame, and the second link member is rotatably connected to the first-frame lower portion of the first frame.

7. The drive module of claim 6, wherein the third link is oriented to traverse a space surrounded by the first frame, the second frame, the first link, and the second link when one side of the first frame based on a link direction is viewed in parallel with the link direction when the link direction is a direction in which a rotation center of the first link member with respect to the second-frame upper portion of the second frame extends.

8. The drive module of claim 6, wherein:

an axis direction in which a rotation center of the first link member with respect to the second-frame upper portion of the second frame extends is a link direction, passing through a first center of the first-second end and extending in the link direction is a first link rotation axis, and passing through a second center of the second-first end and extending in the link direction is a second link rotation axis, the link unit further comprises:

the first link shaft configured to define the first link rotation axis; and a second link shaft configured to define the second link rotation axis, the first-second end and the first link member are coupled to the first link shaft and configured to rotate about the first link rotation axis, and the second-first end and the second link member are coupled to the second link shaft and configured to rotate about the second link rotation axis.

9. The drive module of claim 2, further comprising:

a support part configured to define the first rotation axis and support the wheel; and a steering motor configured to rotate the support part about a second rotation axis extending in a second direction intersecting the first direction, and configured to steer the wheel, wherein:

the steering motor is disposed above the support part, and the first frame is fixed to the steering motor.

10. The drive module of claim 9, wherein:

a reference straight line passes through a first center of the first-second end and a second center of the second-second end, the drive module is configured to be placed in a first posture in which the second rotation axis and the reference straight line are provided in a parallel manner and a second posture in which the first frame is lowered relative to the second frame from the first posture, and the second rotation axis and the reference straight line are provided in a non-parallel manner when the drive module is in the second posture.

11. The drive module of claim 10, wherein the first link length is shorter than the second link length.

12. The drive module of claim 9, wherein the second-first end is disposed above the support part.

13. The drive module of claim 9, wherein:

the support part has a suspension configured to connect a support-part lower portion of the support part and a support-part upper portion of the support part, the first frame is fixed to a horizontally lateral portion of the steering motor, and the first frame at least partially overlaps the suspension of the support part when the drive module is viewed from above.

14. A movable object, comprising:

a body; and a drive module configured to move the body, wherein the drive module comprises:

a wheel configured to rotate about a first rotation axis extending in a first direction;

a first frame coupled to the wheel;

a second frame coupled to the body, wherein the first frame is configured to move relative to the second frame;

a link unit configured to connect the first frame and the second frame; and a posture adjustment part configured to adjust a posture of the drive module by controlling a motion of the link unit to change a position of the first frame with respect to the second frame, wherein the link unit comprises:

a first link comprising a first-first end rotatably connected to a first-frame upper portion of the first frame, and a first-second end rotatably connected to a second-frame upper portion of the second frame via a first link shaft that penetrates the second-frame upper portion;

a second link comprising a second-first end rotatably connected to a first-frame lower portion of the first frame, and a second-second end rotatably connected to a second frame lower portion of the second frame; and a third link comprising a third-first end connected to the second-frame upper portion of the second frame at a location at which the first link shaft penetrates the second-frame upper portion, and wherein the posture adjustment part comprises a posture adjustment motor having a shaft fixed to any one of the first-first end, the first-second end, the second-first end, and the second-second end.

15. The movable object of claim 14, wherein a first link length between the first-first end and the first-second end is different than a second link length between the second-first end and the second-second end.

16. The movable object of claim 14, wherein:

the second frame is mounted on a body lower portion of the body, and the wheel is configured to move toward or away from the body in response to the posture of the drive module being controlled by the posture adjustment part.

17. The movable object of claim 16, wherein the first rotation axis intersects a ground surface in a state in which the wheel is maximally moved away from the body.

18. A modular drive device configured to attach to a body, the modular drive device comprising:

a wheel comprising a wheel motor therein;

a support part, wherein the wheel is rotatably coupled to a lower portion of the support part such that the wheel is configured to rotate about a first rotation axis extending in a first direction, wherein the support part includes a suspension system configured dampen a vertical movement of the wheel relative to the support part, wherein the wheel motor is configured to provide rotational power and rotation of the wheel relative to the support part;

a steering motor rotatably coupled to an upper portion of the support part configured to rotate the support part about a second rotation axis extending in a second direction non-parallel with the first direction, and wherein the steering motor configured to steer the wheel via rotation of the support part;

a first frame attached to the steering motor;

a second frame configured to attach to the body;

a link unit configured to couple the first frame and the second frame such that first frame is configured to move relative to the second frame; and a posture adjustment part configured to adjust a posture of the modular drive device by controlling a motion of the link unit to change a position of the first frame with respect to the second frame, wherein the link unit comprises:

a first link comprising a first-first end rotatably connected to a first-frame upper portion of the first frame, and a first-second end rotatably connected to a second-frame upper portion of the second frame via a first link shaft that penetrates the second-frame upper portion;

a second link comprising a second-first end rotatably connected to a first-frame lower portion of the first frame, and a second-second end rotatably connected to a second frame lower portion of the second frame; and a third link unit comprising a third-first end connected to the second-frame upper portion of the second frame at a location at which the first link shaft penetrates the second-frame upper portion, and wherein the posture adjustment part includes a posture adjustment motor having a motor shaft fixed to a link of the link unit and configured to pivot the link and the first frame via the link relative to the second frame, and thereby being configured to adjust a height of the body relative to the wheel.

19. The drive module of claim 2, wherein the third link extends diagonally across the link unit.

20. The drive module of claim 2, further comprising:

a support part; and a steering motor configured to rotate the support part, wherein the first frame is fixed to the steering motor.

* * * * *